W. F. PRESSLER.
AUTOMATIC WATER SUPPLY REGULATOR FOR WINDMILLS.
APPLICATION FILED MAR. 8, 1917.
1,245,616.
Patented Nov. 6, 1917.
2 SHEETS—SHEET 1.
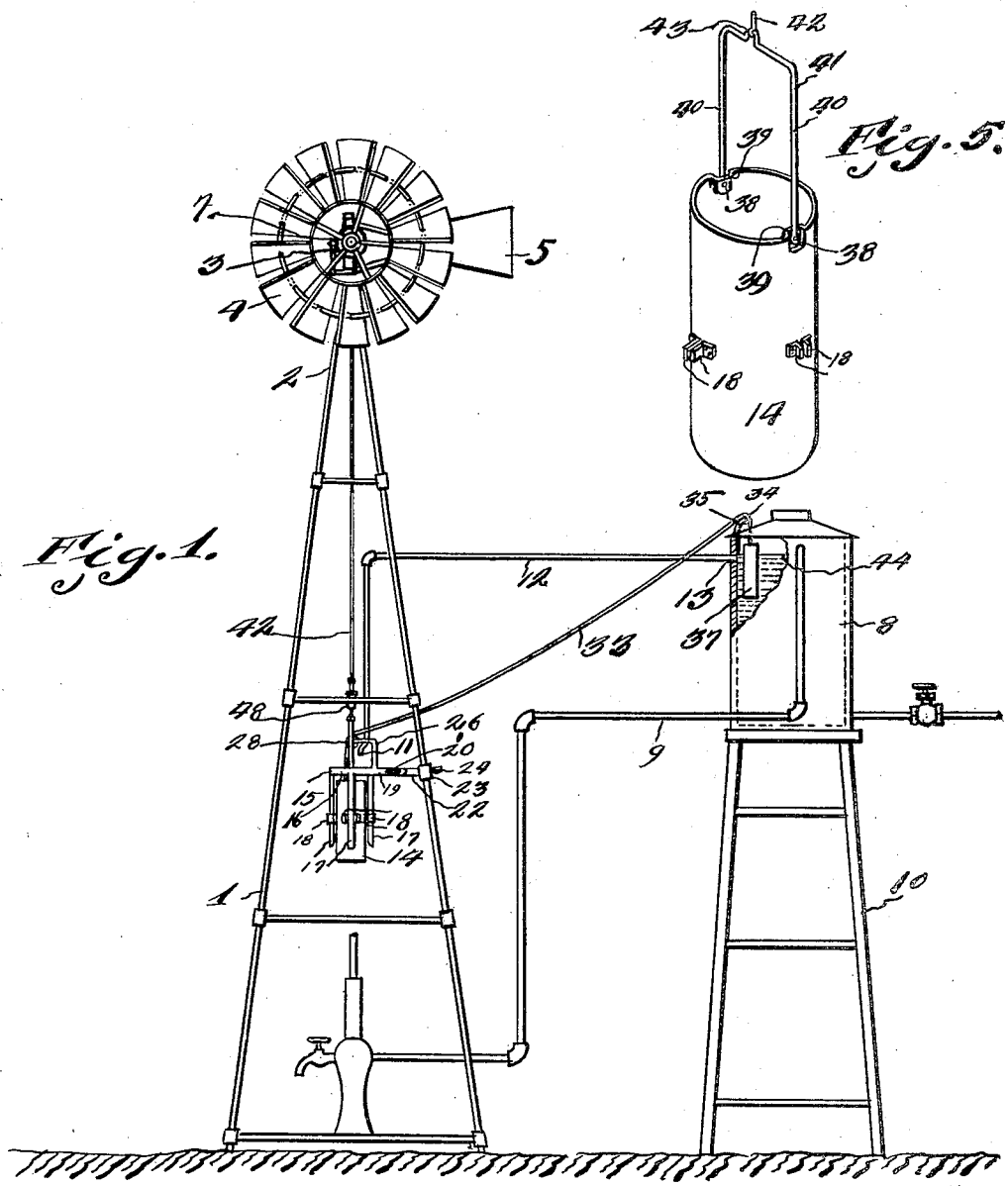
Inventor
Walter F. Pressler
By
Philip A. H. Sewell
his Attorney

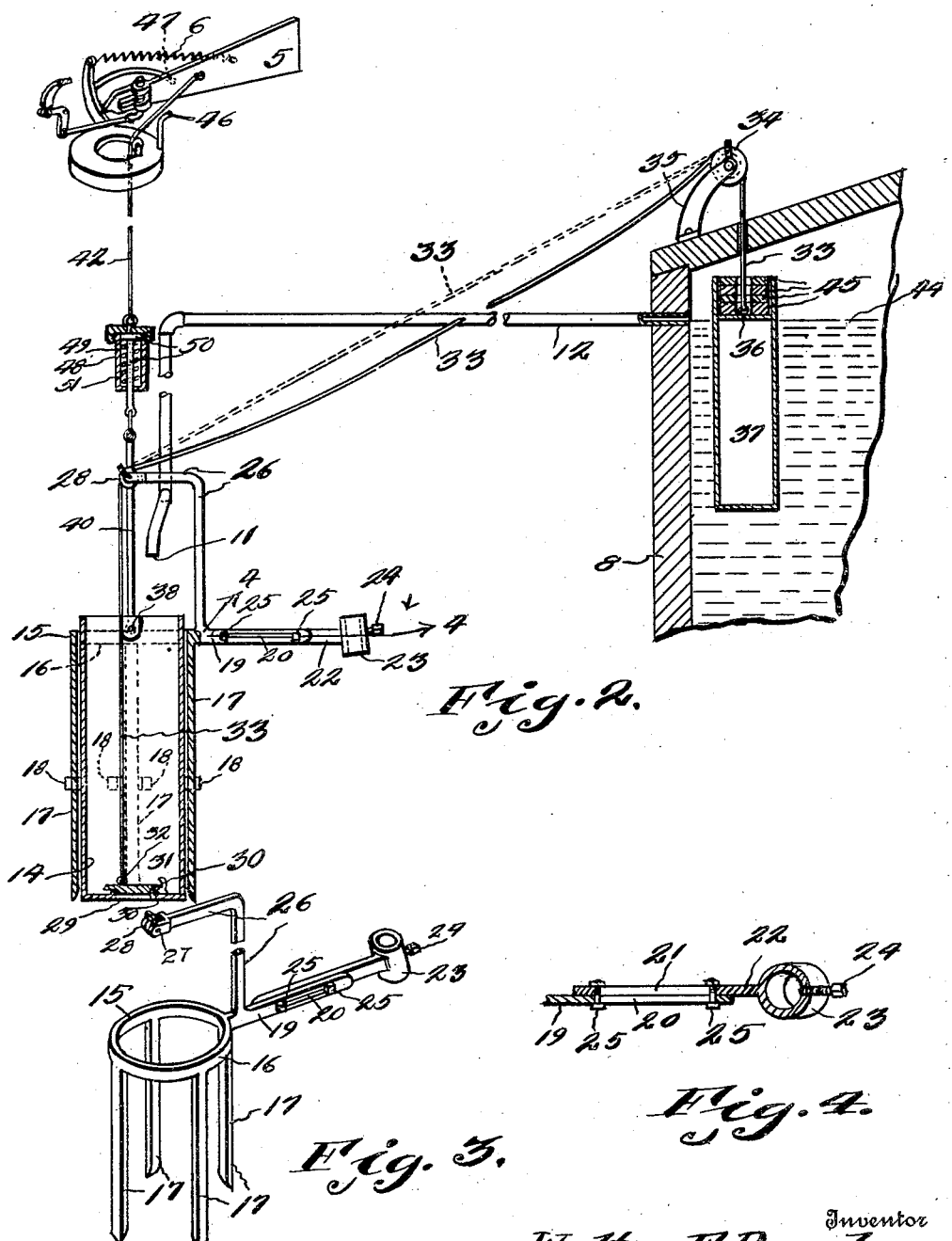

UNITED STATES PATENT OFFICE.

WALTER F. PRESSLER, OF TOSCA, TEXAS.

AUTOMATIC WATER-SUPPLY REGULATOR FOR WINDMILLS.

1,245,616.  Specification of Letters Patent.  Patented Nov. 6, 1917.

Application filed March 8, 1917. Serial No. 153,409.

*To all whom it may concern:*

Be it known that I, WALTER F. PRESSLER, citizen of the United States of America, residing at Tosca, in the county of Gillespie and State of Texas, have invented certain new and useful Improvements in Automatic Water-Supply Regulators for Windmills, of which the following is a specification, reference being had therein to the accompanying drawing.

The invention has for its object to provide means, whereby as the water in the storage tank, commonly used in connection with windmills, reaches a predetermined height, the wind wheel of the motor will be automatically stopped and consequently the inflow of water into the storage tank stopped. Also as a predetermined amount of water in the storage tank is consumed the wind wheel will be automatically released and allowed to revolve, thereby again pumping water into the storage tank, these actions of stopping and starting being repeated and consequently preventing the overflow of the storage tank.

A further object is to automatically stop and start the wind wheel and consequently the pumping action of the motor, by means of a vertically guided receptacle, having a valve therein, said valve being connected to and controlled by a float in the storage tank, said vertically guided receptacle being also connected by means of a wire to the tail or rudder of the wind-wheel so that upon a downward movement of said receptacle, the rudder will be swung against the action of springs and at the same time apply the brake to said wind-wheel.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:—

Figure 1 is a front elevation of a windmill tower and storage tank.

Fig. 2 is an enlarged detail sectional view, through a portion of the storage tank and the vertically movable receptacle.

Fig. 3 is a perspective view of the guiding yoke for the vertically movable receptacle.

Fig. 4 is a sectional view on line 4—4 of Fig. 2.

Fig. 5 is a perspective view of the vertically movable receptacle.

Referring to the drawings 1 designates a conventional form of windmill tower, upon the upper end 2 of which a conventional form of wind motor 3 is mounted. The motor 3 is provided with a conventional wind-wheel 4 adapted to be rotated by the action of the wind. The motor 3 is also provided with a rudder 5, normally held at right angles to the wind wheel by means of springs 6, however as the rudder is swung out of right angled position to the wind wheel, against the action of either of the springs 6, a brake 7 will be actuated, which will stop the motor and consequently the pumping of water; the purpose of stopping the motor will presently appear. The water as it is pumped is conveyed into the storage tank 8, by means of the pipe 9, said storage tank being mounted upon a tower 10, at such a height that the upper end of said tank 8, will be higher than the discharge end 11 of the overflow pipe 12, which is connected at 13 to the tank 8. The discharge end 11 of the overflow pipe 12 is disposed over a vertically movable receptacle 14, which in turn is loosely mounted in the yoke 15. The yoke 15 comprises the annular ring 16 having depending guide arms 17 adapted to be engaged by the guide lugs 18, upon the receptacle 14, so that said receptacle will be prevented from rotation.

The ring 16 of the yoke 15 is provided with an arm 19, having an elongated slot 20 registering with an elongated slot 21 in the arm 22 of the vertically slidable collar 23, which is adapted to be vertically and laterally adjusted on the tower, by means of the set screw 24. Radial adjustment of the yoke 15 may be accomplished by means of the bolts 25. The arm 19 is provided with a vertically and laterally extending arm 26 and mounted upon the pin or bolt 27 in said arm is a pulley 28.

The bottom of the receptacle 14 is provided with a centrally located port 29. Hinged at 30 and adapted to seat upon and normally close said port is a valve 31. Connected at 32, to said valve 31 is a wire or chain 33, which extends upwardly and over the pulley 28, thence over a pulley 34 carried by the bracket 35 which is mounted upon the top of the supply tank 8. The wire or chain then extends downwardly and is connected at 36, to the float 37, in the supply tank.

Connected at 38, in the depression 39, of the receptacle 14 are the arms 40 of the bail 41. A wire 42 is secured at 43 to the bail and is in turn secured to the rudder 5 of the wind motor 3.

The operation is as follows; as the water 44 in the tank 8 rises to the level of the overflow pipe 12, the overflow water will be conveyed through said pipe and discharged into the receptacle 14. The combined weight of said water and receptacle 14, will overcome the tension of one of the springs 6 and swing the rudder 5 to one side, thereby operating the brake 7 and stopping the motor. As the water 44 in the tank 8 is consumed, the float 37 will fall until the slack in the wire or chain 33 is taken up, the valve 31 will be opened and the water in the receptacle allowed to escape, thereby allowing the rudder to swing outwardly and into its normal position with the wind wheel 4 and consequently releasing the brake 7, the tension of the springs 6 being strong enough to raise and support the receptacle 14 when empty.

The submersion of the float can be regulated by means of the weights 45 and the amount of slack in the wire or chain 33 may be regulated as desired.

It will be noted that as the rudder 5 is swung from one position to the other and is suddenly stopped, by the stops 46 and 47, that the momentum of the bucket on the sudden stop of the rudder, will cause considerable strain upon the wire 42 and often break the same. To obviate this a resilient connection 48 is provided on the wire 42, which consists of a casing 49, having a piston and piston rod 50 mounted therein. A spring 51 is interposed between the piston and the bottom of the casing, thereby providing a yieldable member to take up the sudden shock incident to the sudden stopping of the rudder in its two positions.

The invention having been set forth what is claimed as new and useful is:—

In combination with a wind mill, a pump operated by the wind mill and a tank supplied by the pump, a float in the tank connected to a normally closed valve in a vertically movable weight vessel, said weight vessel being connected to the controlling element of the wind mill and held raised thereby when the wind mill is in operation, an overflow pipe leading from the tank and arranged to discharge into the weight vessel, means to open the valve of the weight vessel when the weight vessel is in a lowered position, an adjustable yoke guiding means surrounding the weight vessel and having depending arms preventing binding of the weight vessel during its upward and downward movement, means at diametrically opposite sides of said weight vessel to engage said depending arms thereby preventing rotation of the weight vessel and means whereby the yoke member may be laterally adjusted, extended and secured in its adjusted position.

In testimony whereof I hereunto affix my signature.

WALTER F. PRESSLER.

Copies of this patent may be obtained for five cents each, by addressing the "Commissioner of Patents, Washington, D. C."